United States Patent [19]

Sogoian

[11] Patent Number: 4,831,741
[45] Date of Patent: May 23, 1989

[54] MANUFACTURING GAGING SYSTEM FOR QUALITY CONTROL

[76] Inventor: Kaloust P. Sogoian, 16210 North Park Dr., Southfield, Mich. 48075

[21] Appl. No.: 188,691

[22] Filed: May 2, 1988

Related U.S. Application Data

[63] Continuation of Ser. No. 10,779, Feb. 4, 1987, abandoned.

[51] Int. Cl.[4] .............................................. G01B 3/28
[52] U.S. Cl. ........................................ 33/502; 33/557; 33/558; 33/572
[58] Field of Search ................ 33/502, 567, 548, 552, 33/555, 556, 557, 558, 572

[56] References Cited

U.S. PATENT DOCUMENTS

| | | | |
|---|---|---|---|
| 2,403,898 | 7/1946 | Aller et al. | 33/548 |
| 2,716,287 | 8/1955 | Hilstrom | 33/519 |
| 3,021,603 | 2/1962 | Beeson | 33/548 |
| 3,102,344 | 9/1963 | Herman | 33/548 |
| 3,557,462 | 1/1971 | Kiewicz et al. | 33/556 |
| 3,670,421 | 6/1972 | Kiewicz et al. | 33/169 B |
| 3,769,713 | 11/1973 | Norman | 33/548 |
| 3,869,800 | 3/1975 | Bartlett et al. | 33/178 E |
| 4,221,053 | 9/1980 | Bobel, II et al. | 33/172 E |
| 4,227,308 | 10/1980 | Talansky et al. | 33/169 B |
| 4,238,885 | 12/1980 | Lendi et al. | 33/143 L |
| 4,326,336 | 4/1982 | Hreha | 33/548 |
| 4,364,178 | 12/1982 | Huet | 33/174 L |
| 4,393,717 | 7/1983 | Mason et al. | 73/821 |
| 4,436,990 | 3/1984 | Saccucci | 33/169 B |
| 4,516,326 | 5/1985 | Calcagno, Jr. | 33/169 B |
| 4,640,014 | 2/1987 | Thomas | 33/557 |

*Primary Examiner*—William D. Martin, Jr.
*Attorney, Agent, or Firm*—Krass & Young

[57] ABSTRACT

Present invention is a manufacturing gauging system for statistical process control including a gauging fixture for holding a manufacturing part in a fixed location and orientation and for positioning a transducer probe in a predetermined relationship to a manufactured dimension of the part, a non-volatile memory for storing a set of tolerance dimensions relative to the manufactured dimensions of the part and a data processing system which receives sequential signals from the transducer probe relating to measurements of manufacturing dimensions of the part and stores them in the non-volatile memory. The gauging fixture includes a plurality of zero-based measurement stations. Each zero-based measurement station enables positioning of a transducer probe in a predetermined location and orientation relative to the part for providing a reference to a specified measure of the manufactured dimension of the part. Once these dimensions have been stored for a particular part, a new part is placed on the gauging fixture. The data processing system enables statistical process control by comparison of the actual measured dimensions with the predetermined tolerance dimensions stored on the non-volatile memory. This system enables the rapid measurement and quality control computation of a series of manufactured parts by relatively unskilled labor.

8 Claims, 11 Drawing Sheets

MANUFACTURING GAGING SYSTEM FOR QUALITY CONTROL

This is a continuation of co-pending application Ser. No. 010,779 filed on 2/4/1987 and now abandoned.

FIELD OF THE INVENTION

The field of the present invention is the field of manufacturing quality control, and in particular manufacturing gauging systems which enable measurement of the quality of machined dimensions of manufactured parts.

BACKGROUND OF THE INVENTION

One of the keys to manufacturing quality control is the ability to test the quality of the manufactured product. Early and frequent testing of the quality of the manufactured product enables better control of the manufacturing process by providing better information of the current quality. It is typical to perform quality control checks on only a minority of the manufactured products in order to reduce the cost of quality testing.

In accordance with the prior art the cost of checking manufactured products is prohibitive in both time and money. Firstly, in accordance with the prior art such quality control tests require extensive, specialized fixtures in order to hold the manufactured parts in desired orientation and to make the necessary product measurements. In addition, the operation of these specialized fixtures, and in particular the proper method of measurement requires extensive, specialized knowledge of the particular measurement system and of the particular part in order to provide the proper measurements. Even so, such a process is prone to human error because the process is not standardized among different parts but must be performed differently for each different part. Even when such a process is partially automated, it requires a high degree of knowledge on the part of the operator in order to obtain proper results. In particular, a high degree of skill is necessary in order to properly read part blueprints in order to measure the proper dimensions on the manufactured part.

Accordingly, there is a need for a simplified, quality control checking function which does not require extensive operator training. Such a system would greatly reduce the cost of manufacturing quality control and hence tend to increase the manufacturing quality.

SUMMARY OF THE INVENTION

The present invention is a manufacturing gauging system for statistical process control which includes a gauging fixture specifically designed for receiving a particular part and maintaining it in a fixed location and orientation and having a plurality of measurement stations in predetermined locations and orientations in relationship to the manufactured part these measurement stations providing a reference to a specified dimension of the manufactured part, and a transducer probe used with the measurement stations for generating an electrical signal indicative of the deviation of the manufactured dimension from the corresponding specified measure. In accordance with a first embodiment of the gauging fixture of the present invention, each measurement station includes a hole through a measurement block for accommodation of a substantially cylindrical transducer probe, this hole having a predetermined depth related to the manufactured dimension to be measured so that the transducer probe measures only the deviation from the desired measure. In accordance with a second embodiment of the present invention each measurement station is adapted for receiving and holding a measurement block at a predetermined location and orientation relative to the manufactured dimension to be measured, this measurement block holding the transducer probe in a predetermined location.

BRIEF DESCRIPTION OF THE DRAWINGS

These and other objects and aspects of the present invention will come clear from a consideration of the following description of the invention, taken in conjunction with the drawings in which.

DETAILED DESCRIPTION OF THE PREFERRED EMBODIMENT

Figure 1:
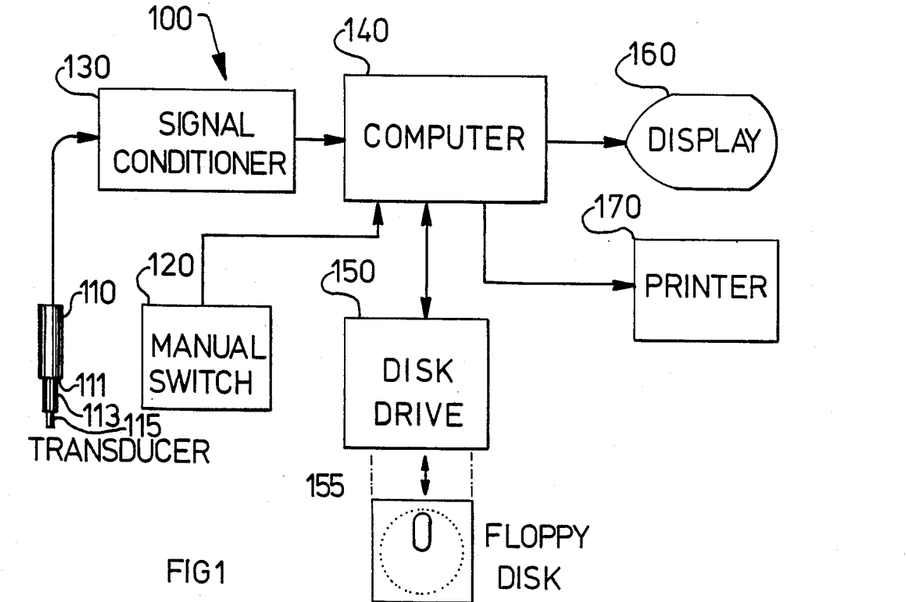
FIG. 1 illustrates schematically the manufacturing gauging system of the present invention.

FIG. 1 illustrates schematically the manufacturing gauging system in accordance with the present invention. Gauging system 100 includes transducer 110, manual switch 120, both of which are operated by the user of the gauging system 100. Gauging system 100 also includes signal conditioner 130, computer 140, disk drive 150, display 160 and printer 170.

The measurements of the manufactured dimensions are made employing transducer 110. Transducer 110 has a movable tip 115 which is allowed to contact the portion of the manufacture part to be measured. Transducer 110 generates an analog electrical signal corresponding to the distance that the movable tip 115 is displaced when contacting the part. This analog electrical signal is applied to signal conditioner 130. Signal conditioner 130 translates this analog output of transducer 110 into a digital signal of the type required by computer 140. This signal conditioning may include the translation of the analog signal from transducer 110 into a linear form, that is it is possible that the output of transducer 110 is not linear with respect to distance and this signal must be converted into a linear signal. In addition, signal conditioner 130 also includes analog to digital conversion in order to generate a digital signal of the type required by computer 140 from the analog output of transducer 110.

Manual switch 120 is used to generate a proper entry verification signal. Upon proper location of transducer 110 and the gauging fixture (to be described later) the operator actuates manual switch 120. Manual switch 120 is connected to computer 140 and indicates to the computer 140 that the signal received from signal conditioner 130 indicates a valid measurement. In accordance with the preferred embodiment of the present invention, manual switch 120 is a foot switch. The operator of the system manipulates transducer 110 by hand and when transducer 110 is properly oriented, the operator steps upon foot switch 120. Those skilled in the part would recognize that other forms of proper entry validation may be employed in the present invention. In particular, manual switch 120 may be mounted on transducer probe 110 for actuation by the hand holding transducer probe 110.

The major control functions of the manufacturing gauging system 100 are performed by computer 140. Computer 140 receives the digital measurement signal from signal conditioner 130 and further receives the verification signal from manual switch 120. Upon receipt of this measurement signal, computer 140 transmits this data to disk drive 150 for storage on floppy disk 155. Computer 140 has been programmed to permit entry of a plurality of measurements for each selected manufactured part, in a predetermined order. That is, the measurements received from transducer 110 are required to be in a particular order in order to ensure proper storage of this data on floppy disk 155. Computer 140 further controls display 160 and printer 170 which provide outputs of the data received from transducer 110. In accordance with the preferred embodiment of the present invention, computer 140 may generate either a tabular output of a plurality of dimensions for each manufactured part on either display 160 or printer 170, or may generate a graph of the relation between the measured dimension of a single measurement of a plurality of parts in regards to the measurement tolerances on either display 160 or printer 170.

Computer 140 also interfaces with disk drive 150 to store on floppy disk 155 the nominal dimensions and the tolerances for each dimensions of the particular parts to be measured. This function occurs upon initialization of floppy disk 155. In accordance with the preferred embodiment, each particular gauging fixture, and therefore each particular part has a corresponding dedicated floppy disk 155. This floppy disk 155 includes data on the nominal and tolerance dimensions and the number of dimensions to be measured for the particular manufactured part.

Figure 2:
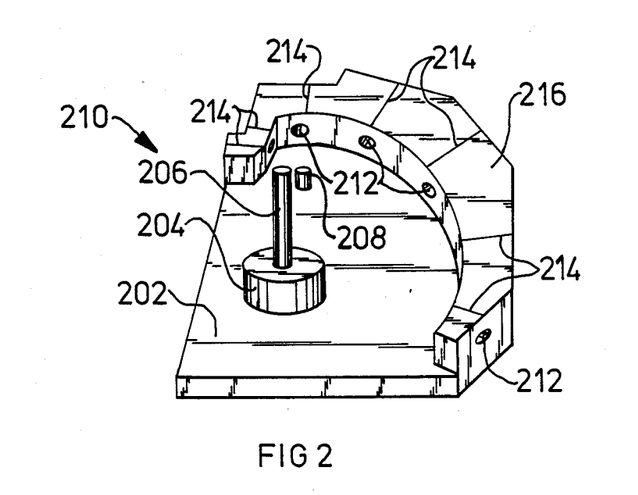
FIG. 2 is an exploded view of a first embodiment of the gauging fixture in relation to its corresponding manufactured part.

FIG. 2 illustrates the relationship between a particular gauging fixture 210 and its corresponding manufactured part 250. Part 250 is a cam. These two structures are illustrated in a exploded diagram in FIG. 2.

Gauging fixture 210 includes means to accommodate the cam 250 and means to accommodate the transducer 110. Gauging fixture 210 includes plate 202 which serves as a major support and stable surface for gauging fixture 210. Gauging fixture 210 also includes a post formed of posts 204 and 206 which serve to engage the major aperture of cam 250. Post 204 rises from base plates 202 and post 206 rises from post 204. Gauging fixture 210 also includes minor post 208 which serves to engage a minor aperture in the cam. Disposed around a periphery of the position where cam 250 will be located on gauging fixture 210 is a raised block 216. Raised block 216 includes a plurality of apertures 212 facing the central portion of gauging fixture 210. Each aperture 212 includes a gauging line 214 scribed in the upper surface of block 216. These scribed lines 214 serve to identify the positions of apertures 212 when gauging fixture 210 is viewed from above.

Gauging fixture 210 has been constructed in order to receive cam 250 and maintain cam 250 in a predetermined location and orientation. Cam 250 includes a machined surface 252 and a raised cylindrical portion 254. Cylindrical portion 254 includes a major aperture 256 therein. A minor aperture 258 is formed in surface 260 of the cam. In use, cam 250 is disposed on gauging fixture 210 by inserting both posts 206 and 204 through the major aperture 256. In addition, post 208 is inserted with aperture 258. Thus cam 250 may be disposed at a predetermined location and orientation in relationship to the apertures 212 disposed in block 216.

Figure 3:
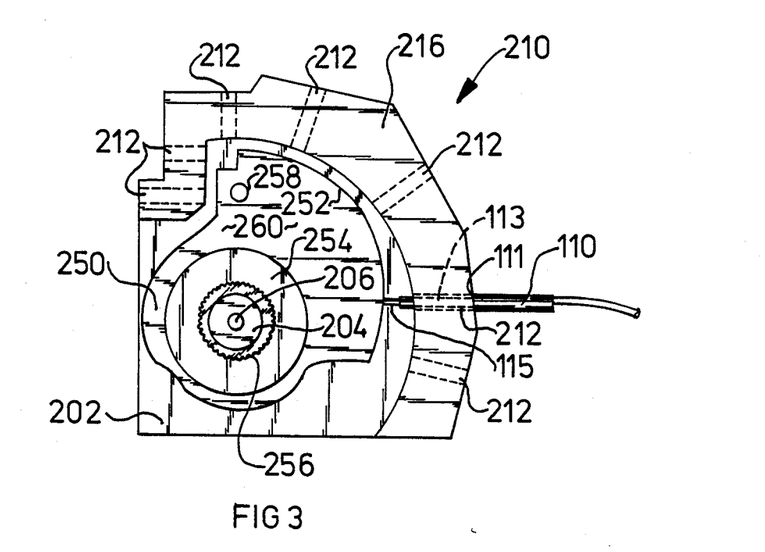
FIG. 3 is an overhead view of the placement of the manufactured part in the gauging fixture illustrated in FIG. 2, further illustrating the use of the transducer probe.

FIG. 3 illustrates an overhead view of gauging fixture 210 with cam 250 disposed thereon. Note that transducer probe 110 is inserted through one of the transducer holes 212. The shoulder portion 111 of transducer probe 110 stops the insertion of transducer probe 110 into the transducer hole 212. Thus the diameter of transducer hole 212 must be greater than the diameter of the narrower portion 113 but less than the diameter of the shoulder portion 111. Movable tip 115 extends past the transducer hole 212 and touches the machined surface 252 of cam 250 at a predetermined location determined by the location of transducer hole 212. The exact dimensions from the external face of block 216 to the machined surface 252 of cam 250 is set so that if this dimension of cam 250 is equal to the nominal value then the output of transducer probe 110 indicates zero deviation. If however the machined dimension of cam 250 differs from the nominal value then transducer probe 110 generates a signal indicative of this deviation.

Measurement of a plurality of dimensions of cam 250 can now be made in a rapid fashion. Firstly, cam 250 is placed upon gauging fixture 210 in the predetermined location and orientation determined by posts 204 and 208. Then transducer probe 110 is sequentially inserted into the transducer holes 212 around the periphery of cam 250. In accordance with the preferred embodiment of the present invention, this sequence of measurements occurs in a predetermined order, which order is known to computer 140. After the transducer probe has been inserted within one of the transducer holes 212, in accordance with the predetermined order, then switch 120 is activated. Computer 140 then stores the signal received from signal conditioner 130 which is indicative of the deviation of the measured dimension from the nominal value for that particular part and that particular dimension. As these indications of the deviation are received, computer 140 causes disk drive 150 to store them in predetermined locations within floppy disk 155. Once measurement on a particular cam has been completed in accordance with the predetermined sequence, that cam is removed from gauging fixture 210 and another cam is inserted in its place. Because computer 140 has been programmed cognizant of the predetermined sequence of measurements, computer 140 automatically knows when a new measurement is the first measurement of the sequence on a subsequent part.

Figure 4:
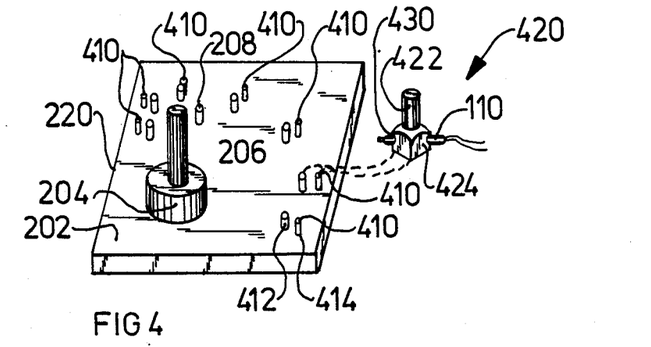
FIG. 4 is an elevation plan view of a second embodiment of the manufacturing gauging fixture in accordance with the present application.
Figure 5:
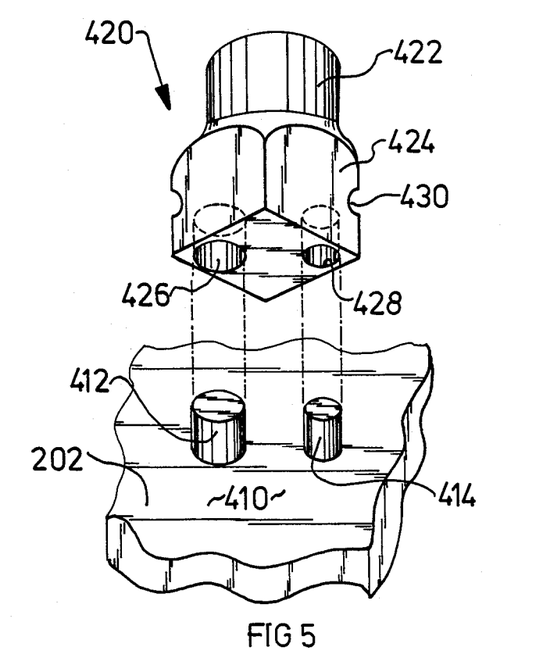
FIG. 5 is an illustration of the relationship between the fixed location of the measurement station of the manufacturing gauging system illustrated in FIG. 4 and the measurement block.
Figure 6:
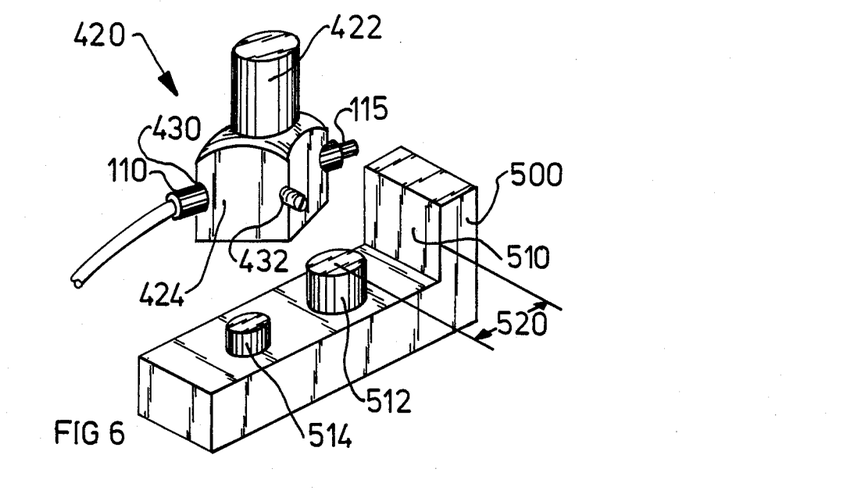
FIG. 6 illustrates a manner of calibration to zero of the measurement block illustrated in FIGS. 4 and 5.

FIGS. 4, 5 and 6 illustrate the use of another embodiment of a gauging fixture. Gauging fixture 220 illustrated in FIG. 4 includes plate 202, posts 204 and 206 and post 208 in the manner previously illustrated with respect to FIG. 2. Gauging fixture 220 also includes a plurality of measurement stations 410, each corresponding to one of the measurement stations 214 illustrated in FIGS. 2 and 3. Each such measurement station 410 includes a first post 412 and a second post 414, disposed at a predetermined location in a predetermined orientation. A movable measurement block 420 may be inserted upon each measurement station 410 to effect the measurement of the desired dimensions of the cam. Measurement block 420 includes handle 422 and block portion 424. Block portion 424 includes transducer aperture 430 (see FIG. 5) through which transducer probe 110 is inserted. In accordance with this embodiment of the present invention, measurement block 420 is sequentially located at measurement stations 410 of the gauging fixture 220 in order to make the measurements of the desired dimensions on the cam.

The insertion of measurement block 420 onto measurement station 410 is best illustrated in FIG. 5. In accordance with FIG. 5, first post 412 and second post 414 are disposed upon plate 204, forming measurement station 410. First post 412 is accurately machined in relation to the position of the cam when inserted on posts 204 and 206. Post 414 may be machined to a lesser accuracy except for the orientation between posts 412 and 414. Thus, post 414 serves mainly to establish the orientation of the transducer probe at measurement station 410, while post 412 serves to accurately position the transducer probe in relation to the desired dimension of the cam. Measurement block 420 includes a pair of apertures 426 and 428. Aperture 426 is accurately machined in order to fit snuggly over post 412. This ensures that the block 420 is accurately positioned in relation to the cam. Aperture 428 is machined to be slightly larger than the post 414. As the case of post 414, aperture 428 is employed merely to ensure the proper orientation of the transducer probe during measurement. Therefore, this aperture need not be as accurately machined as aperture 426.

In use, measurement block 420 is placed in the proper position and orientation in accordance with measurement station 410 by the insertion of post 412 into aperture 426 and post 414 into aperture 428. This ensures that the transducer aperture 430 is accurately positioned in space and orientation with regard to the desired dimension to be measured of the cam. As best illustrated in FIGS. 4 and 6, transducer probe 110 is inserted within aperture 430 of measurement block 420.

As illustrated in FIG. 6, transducer block 420 includes a locking device in the form of set screw 432. After transducer 110 is inserted into aperture 430, set screw 432 is tightened to retain transducer 110 in a fixed location during measurement. FIG. 6 further illustrates a calibration structure employed to ensure the proper location and calibration of transducer probe 110. Measurement block 420 is placed upon calibration fixture 500 by placing aperture 426 over post 512 and aperture 428 over post 514. The tip 115 of transducer probe 110 then contacts the face 510 of calibration fixture 500. Because post 512 has been disposed at a predetermined distance 520 from face 510 of the calibration fixture 500, the transducer 110 is then in a fixed relationship. The transducer 110 may be zeroed electrically through signal conditioner 130 or may be zeroed mechanically by sliding it in or out of the aperture 430. In any event, once the proper position for transducer 110 is achieved, set screw 432 is tightened to retain transducer 110 in this fixed location.

Figure 7:
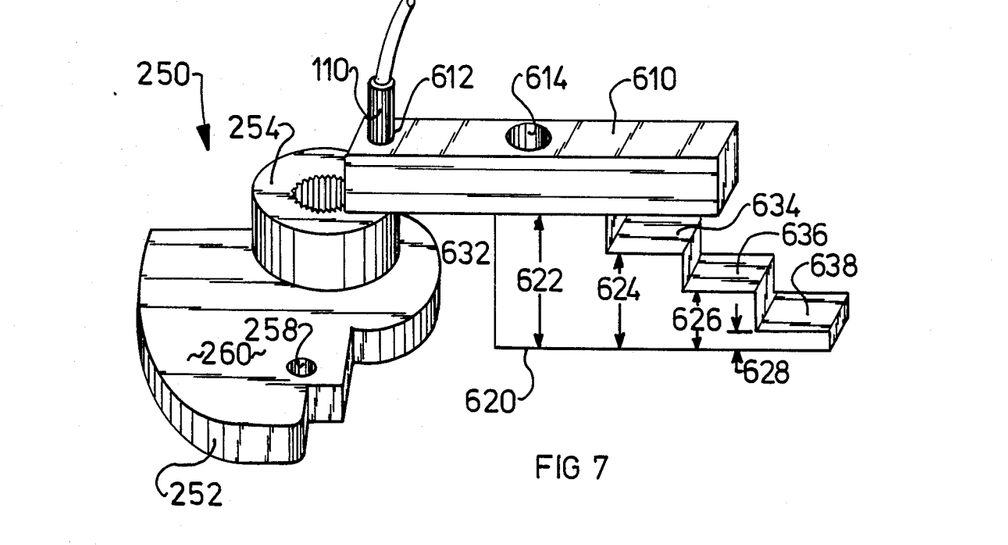
FIG. 7 illustrates a further embodiment of the present invention employing a stepped measurement standard.
Figure 8:
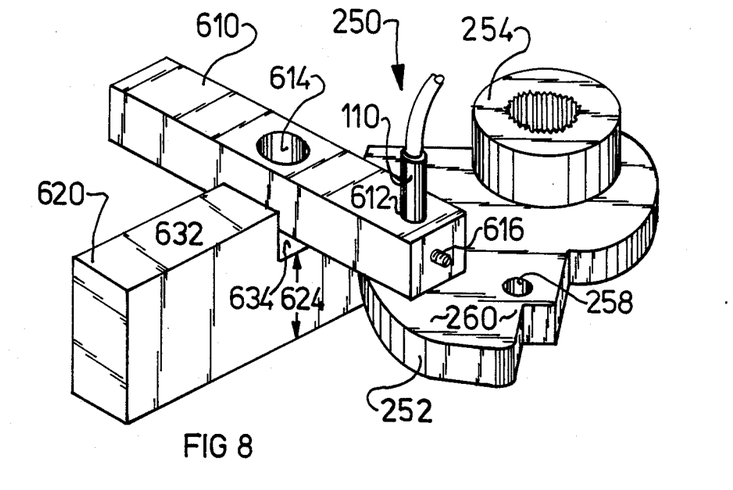
FIG. 8 illustrates a further view of the use of the stepped measurement standard.
Figure 9:
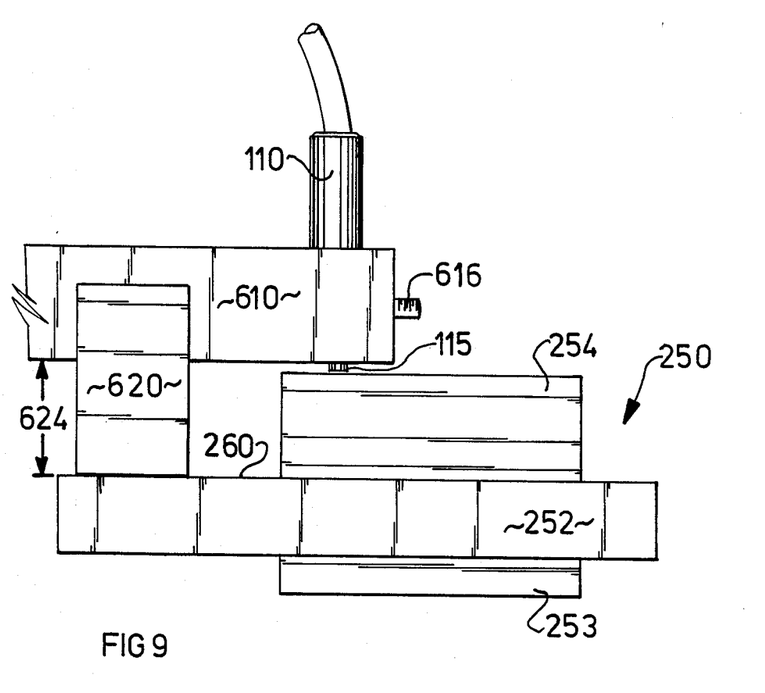
FIG. 9 illustrates a still further view of the use of the stepped measurement standard.

FIGS. 7-9 illustrate another manner of measuring a predetermined dimension of cam 150 employing a measurement block 610 and a gauging standard 620. Measurement block 620 retains the transducer probe 110 and gauging standard 620 serves as a standard of measure.

FIG. 7 illustrates a first use of measurement block 610 and gauging standard 620. Measurement block 610 is placed upon step 632 of gauging standard 620. At this location, gauging fixture 620 disposes the measurement block 610 a distance 622 above the reference surface. Transducer probe 110 is inserted into aperture 612. This transducer probe 110 is retained in a fixed location within aperture 612 via a set screw 616 (illustrated in FIGS. 8 and 9). Measurement block 610 and gauging standard 620 are machined so that placement of measurement block 610 on step 632 ensures that the tip 115 of transducer probe 110 is the predetermined distance corresponding to distance 622 above the reference surface. In the orientation of measurement block 610 and gauging standard 620 illustrated in FIG. 7, the height of cylindrical portion 254 of cam 250 is measured.

FIG. 8 illustrates a second manner of use of the measurement block 610 and the gauging standard 620. As illustrated in FIG. 8, the height of the surface 260 above a reference surface is measured in relation to the height 624 of step 632 of gauging standard 620. In this example, measurement block 610 is disposed on step 634 of gauging standard 620, thereby providing the tip 115 of transducer probe 110 a predetermined distance above the reference surface corresponding to the distance 624 of step 634 above the reference surface.

FIG. 9 illustrates still another use of measurement block 610 and gauging standard 620. In this case, measurement block 610 is disposed nn step 634 (not shown) of gauging standard 620. This ensures that the tip 115 of transducer 110 is a predetermined distance above the surface 260 of cam 250. This predetermined distance is related to the step height 624 of step 634. Thus the height of cylindrical portion 254 is measured not in relation to the reference surface, but in relation to a machined surface of this part.

As illustrated in FIG. 7, gauging standard 620 may include a plurality of steps such as 632, 634, 636 and 638. This steps have respective heights 622, 624, 626 and 628 above the reference surface. The use of these reference heights in conjunction with measurement block 610, enables measurement of the height of various portions of the part to be measured.

Figure 10:
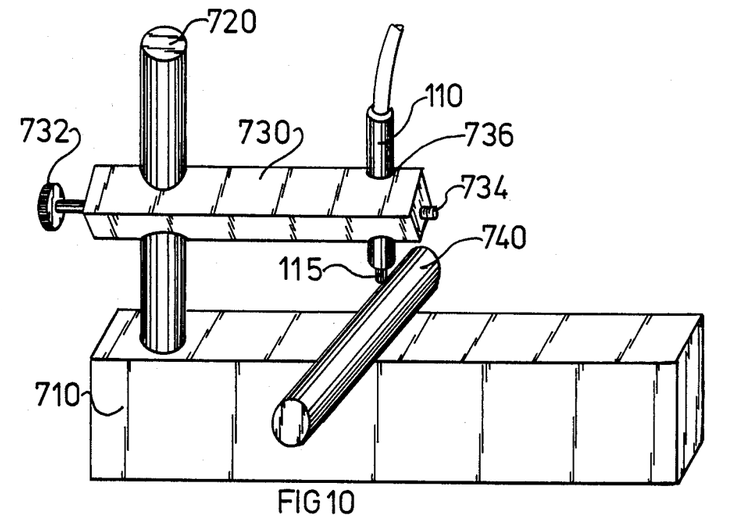
FIG. 10 illustrates a further gauging fixture in accordance with the present invention.
Figure 11:
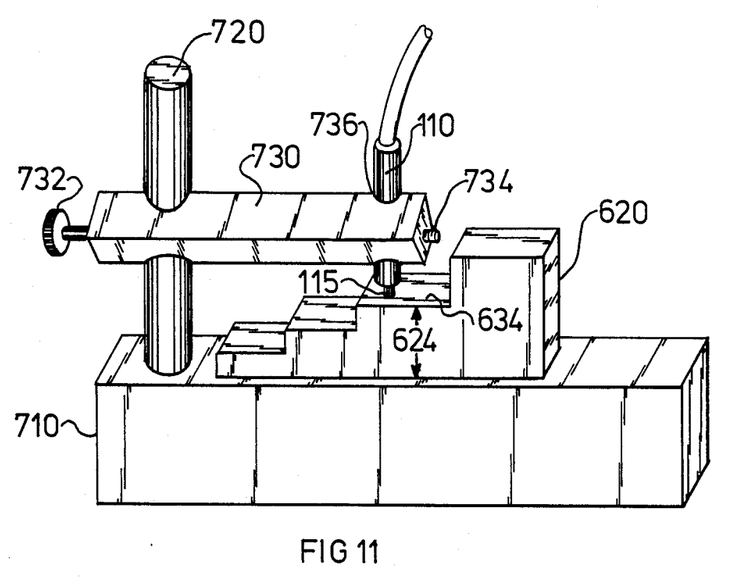
FIG. 11 illustrates the calibration to zero of the gauging fixture illustrated in FIG. 10.

FIGS. 10 and 11 illustrate still another fixture for measuring the dimensions of a part. FIG. 10 illustrates the measurement of the part and FIG. 11 illustrates the manner of calibrating the apparatus.

FIG. 10 illustrates a new fixture for measuring the height of a part. This fixture includes fixed base 710 having post 720 extending from one portion thereof. A movable member 730 moves up and down post 720 and is secured at a fixed location by a screw 732 having a knurled knob. Transducer probe 110 is inserted through an aperture 736 and the other end of movable member 730. Transducer probe 110 is secured in a fixed location within aperture 736 by a set screw 734. FIG. 10 illustrates the measurement of the diameter of cylindrical member 740 using this fixture. Note that tip 115 of transducer probe 110 is disposed at a position near the top portion of cylindrical member 740. In practice, movable member 730 is secured to post 720 at a desired location by the knurled knob 732. Transducer probe 110 is set at a fixed location and retained therein via set screw 734. In this state, the tip 115 of transducer probe 110 is disposed on the surface of cylindrical member 740. Any deviation from the nominal position is measured by a movement of this tip 115.

FIG. 11 illustrates the manner of calibration of the measurement apparatus illustrated in FIG. 10. FIG. 11 illustrates gauging standard 620 disposed on the top surface of stand 710. The dimension 624, which is the height of step 634 above the reference surface of stand 710 is used to set the measurement standard of the apparatus. Firstly, movable member 730 is moved up or down on post 720 to the desired location in regard to the step 634. Movable member 730 is fixed at this location through the use of knurled knob 732. Then transducer probe 110 is inserted into aperture 736. Transducer probe 110 is moved in or out of aperture 736 to the desired location for the particular parts to be measured. At this time it is fixed in this location by tightening set screw 734. Thus FIG. 11 illustrates how the measurement of FIG. 10 is calibrated.

Figure 12:
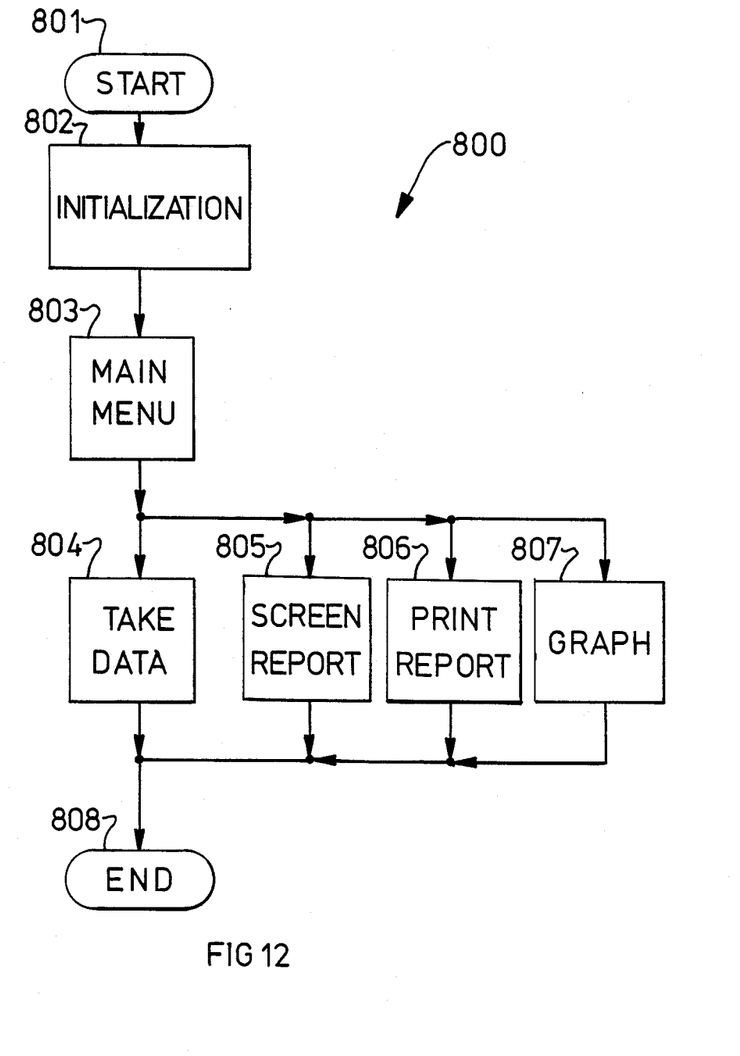
FIG. 12 illustrates a flow chart of the main routine of the program employed in the data processing system of the present invention.
Figure 13:
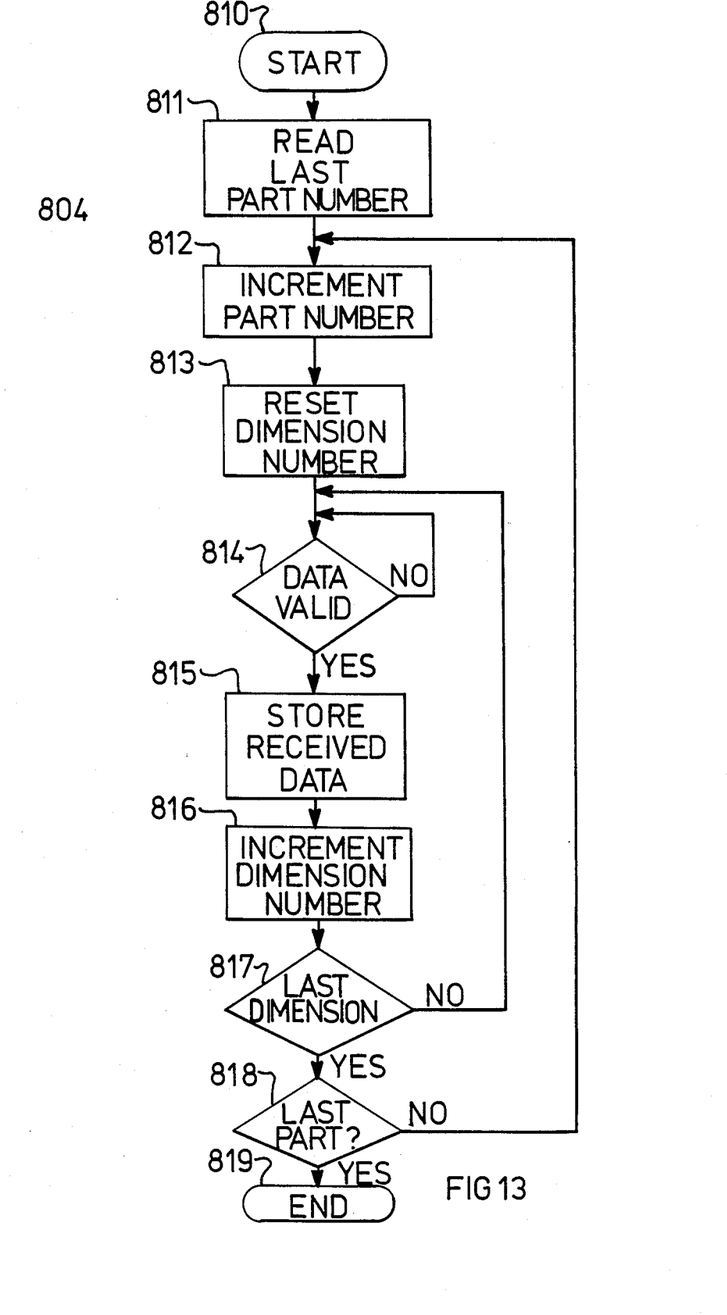
FIG. 13 illustrates a flow chart of the program used to take data in accordance with the present invention.
Figure 14:
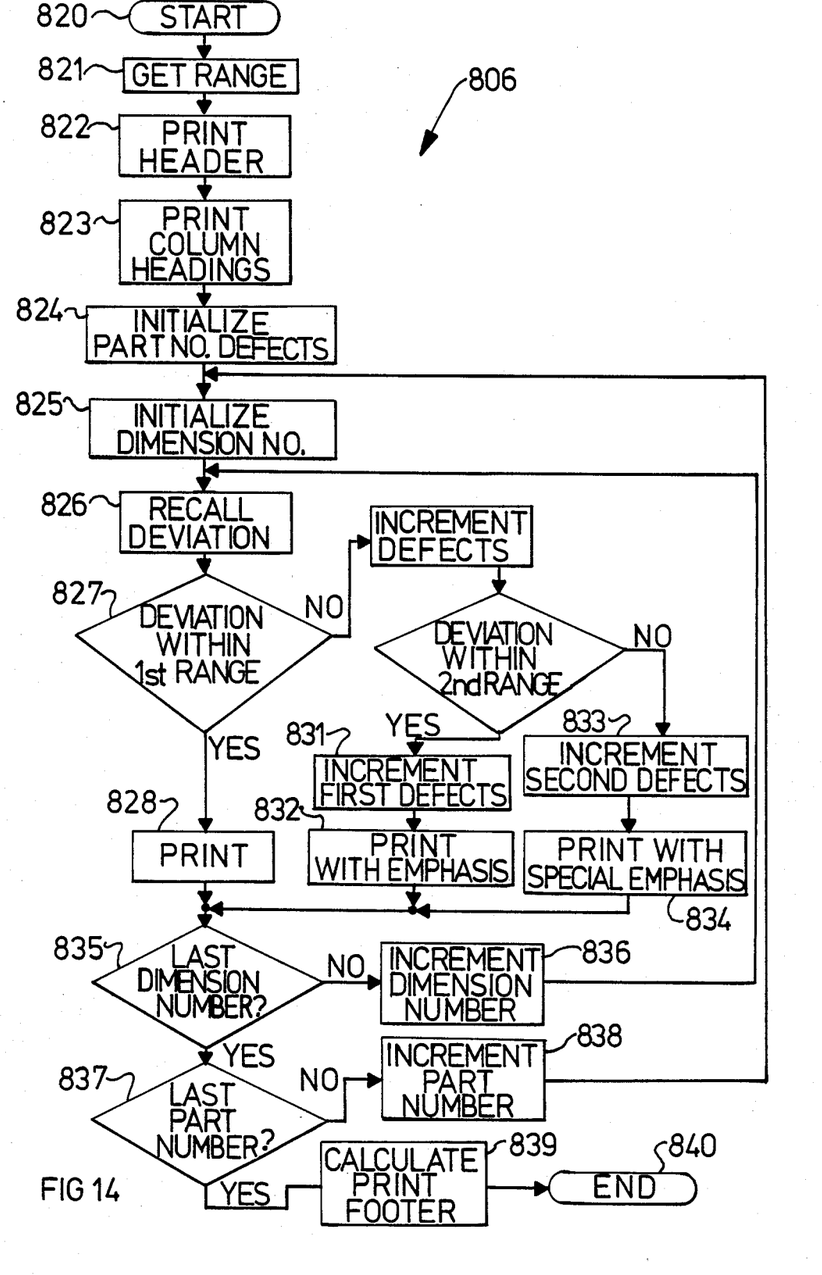
FIG. 14 illustrates a flow chart of the manner in which a tabular display of the stored deviations is formed in accordance with the present invention.
Figure 15:
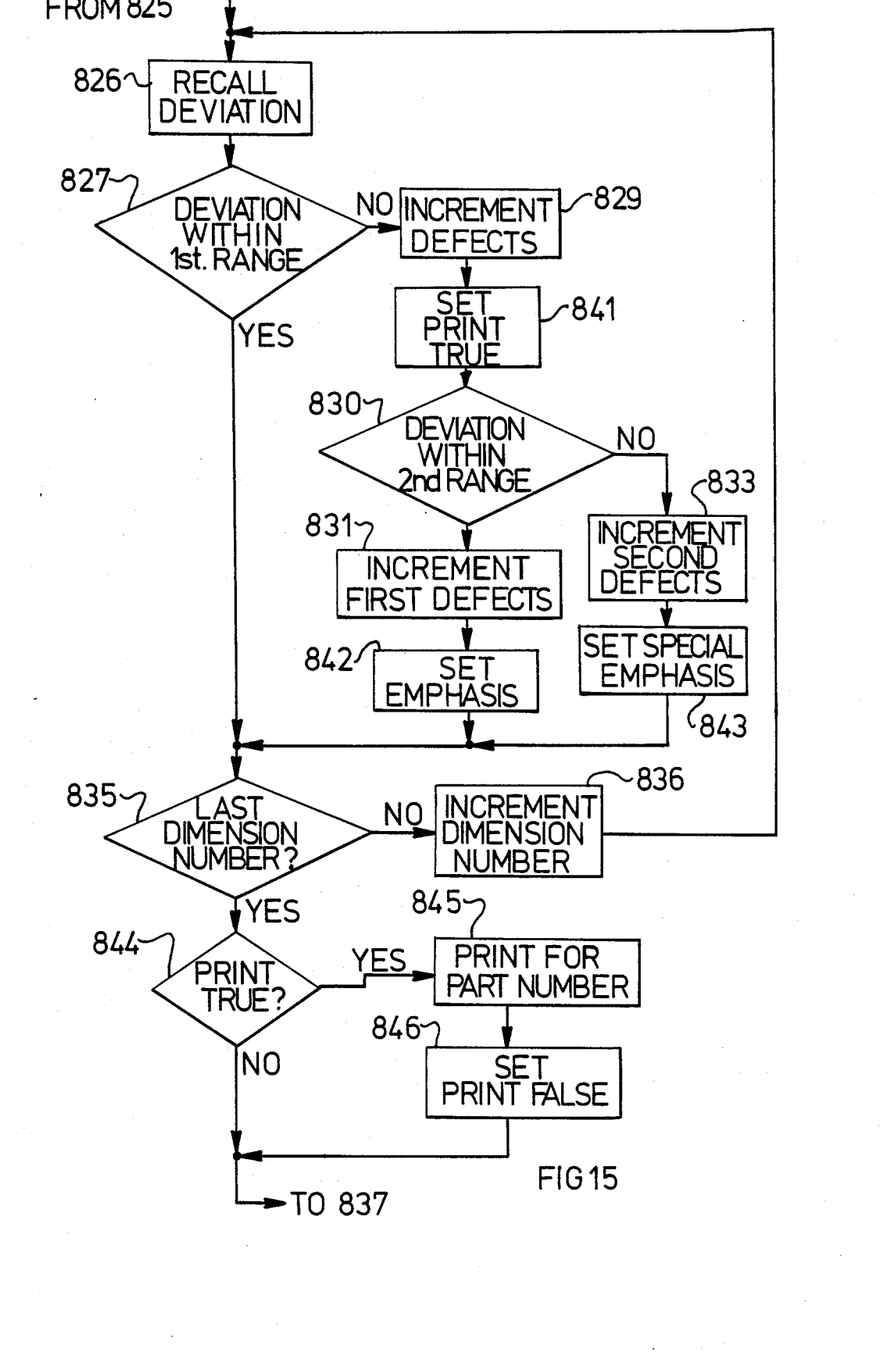
FIG. 15 illustrates an alternative embodiment in which a tabular form of only the deviations out of tolerance is formed.
Figure 16:
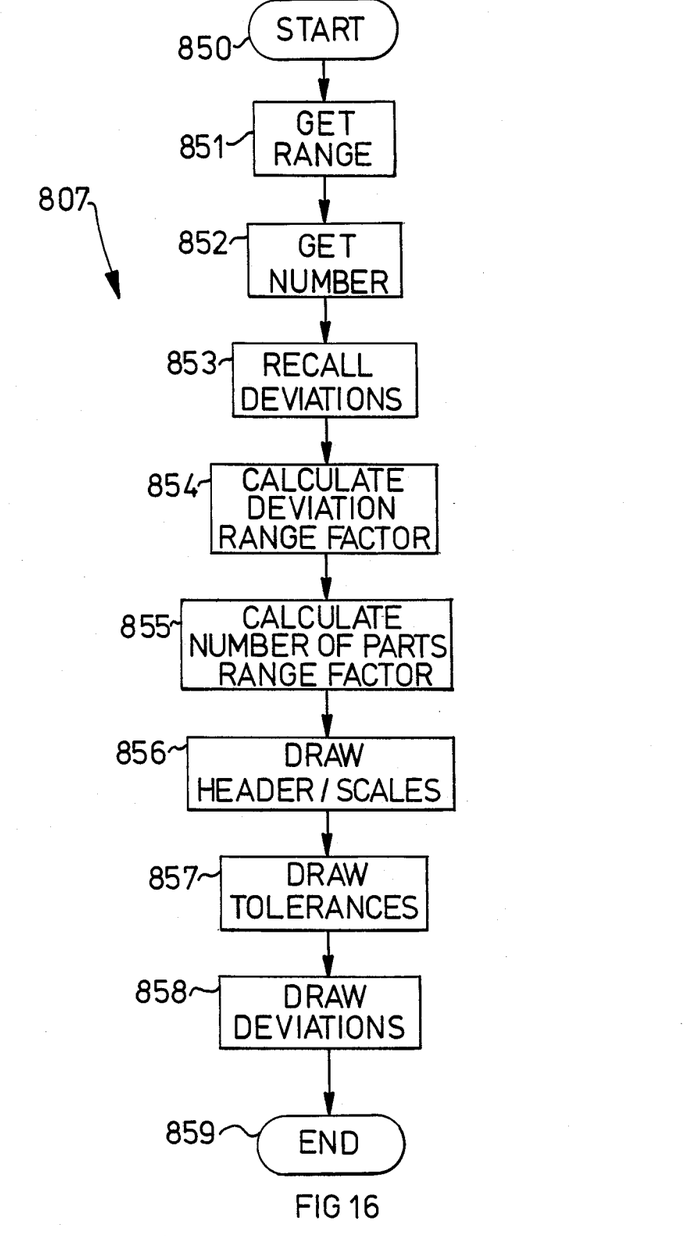
FIG. 16 is an illustration of a flow chart of the formation of a graphic display of the stored deviations in accordance with the present invention.

FIGS. 12-16 illustrate in flow chart form the program employed in computer 140 in order to practice the present invention. FIG. 12 illustrates the overall aspects of the computer program. FIG. 13 illustrates the subroutine for taking data. FIG. 14 illustrates the subroutine for generating a screen report. FIG. 15 illustrates a portion of the program for generating a screen report in accordance with an alternative embodiment. FIG. 16 illustrates the steps in a subroutine to generate a graphic report.

FIG. 12 illustrates the general outline of the program 800 employed in computer 140 in accordance with the computerized measurement technique of the present invention. Program 800 is begun at start block 801. The computer program is initialized (processing block 802) and a main menu is presented to the user (processing block 803). The user then selects among a number of different options including the taking of data (processing block 804), the generation of a screen report (processing block 805), the generation of a printed report (processing block 806) or the generation of a graphic report (processing block 807). Program 800 is exited by an end block 808.

FIG. 13 illustrates the subroutine 804 for taking data in accordance with the preferred embodiment of the present invention. This subroutine is begun at start block 811. Initially, the computer program reads the last part number stored on the particular floppy disk 155 associated with that particular type of part (processing block 811). Subroutine 804 next increments this part number (processing block 812). Subroutine 804 next resets the dimension number (processing block 813) to the first dimension number. Subroutine 804 then tests whether a valid data signal has been received from a manual switch 120 (decision block 814). In the event that no such valid data signal has been received the subroutine 804 continues to test for the receipt of such a valid data signal in a closed loop.

Upon receipt of a valid data signal subroutine 804 stores the received data on floppy disk 155 (processing block 815) identified with the present part number and the present dimension number. Subroutine 804 then increments the dimension number (processing block 816). Subroutine 804 next tests to determine whether or not the last dimension for that particular part has been received (decision block 817). In the event that the data for the last dimension for that particular part has not been received then subroutine 804 returns to decision block 814 to await the valid data signal. This next valid data signal corresponds to the receipt of data for the next dimension of that particular part.

In the event that the last dimension signal for that particular part has been received, subroutine 804 then tests to determine whether or not data for the last part has been received (decision block 818). If data for the last part has not been received then subroutine 804 returns to processing block 812 to renew this process for the next part. If, on the other hand, the data for the last part has been received then subroutine 804 is terminated (exit block 819).

FIG. 14 illustrates then steps in subroutine 806 for the generation of a printed report of the data. The steps for the generation of a screen report in accordance with subroutine 805 are similar in nature and will not be further described here. Subroutine 806 is begun by a start block 820. Subroutine 806 next gets the range of part numbers from the user (processing block 821). This is achieved by requiring the users to answer queries corresponding to the first and the last part number to be subject to the printed report.

The subroutine 806 next performs some preliminary functions in accordance with the generation of the printed report. This includes the printing of a header on the first page (processing block 822) and the printing of the column headings (processing block 823) which identify the part numbers and the respective dimensions of those parts. Subroutine 806 next initializes both the part number and the number of defects discovered (processing block 824). The part number is initialized to the part number forming the beginning of the range received from the user in processing block 821. The number of defects is initialized to zero. A loop is begun with processing block 825 which initializes the dimension number. This dimension number corresponds to the dimension number of the data taken in subroutine 804 illustrated in FIG. 13. Subroutine 806 next recalls from floppy disk 155 the stored deviation corresponding to that particular part number and dimension number.

Subroutine 806 next tests to determine whether or not the recalled deviation is within a first range (decision block 827). In accordance with the preferred embodiment of the present invention the dimensions are compared to two tolerances. The first tolerance is statistical quality control reference range. A second broader range of deviations is employed for the print part specification which is the absolute quality limit for the particular part. If the recalled deviation of the part dimension is within this first range then it is printed (processing block 828) in a column corresponding to that dimension and a row corresponding to the part number.

If the recalled deviation is not within the lo first range then a defect procedure is begun. Firstly, the defect number is incremented (processing block 829). Subroutine 806 then tests to determine whether or not the recalled deviation is within the second range (decision block 830). In this event then a count of the first defects is incremented (processing block 831). Then this deviation is printed with an emphasis (processing block 832) in a manner similar to that of the printing of the normal deviation. In accordance with the preferred embodiment of the present invention an asterisk is appended to each of this deviations printed with emphasis. In the event that the recalled deviation is outside of the second range, and therefore outside the print part specification then an indication of the second defects is incremented (processing block 833). This deviation is then printed with special emphasis (processing block 834). In accordance with the preferred embodiment this special emphasis includes the appending of a pair of asterisks.

Once the printing of the particular recalled deviation has taken place then subroutine 806 checks to determine whether the deviation corresponding to the last dimension number of the particular part has been recalled (decision block 835). In the event that the deviation of the last dimension has not been recalled, then the dimension number is incremented (processing block 836). Subroutine 806 then returns to processing block 826 to recall this next deviation.

In the event that the deviation corresponding to the last dimension number has been recalled then subroutine 806 tests to determine whether or not the last part number has been reached (decision block 837). This test is to determine whether or not the print-out has been made of the last part number in the range selected by the user in processing block 821. If the deviations corresponding to all dimensions of the last part number have not been printed then subroutine 806 increments the part number (processing block 838). Control of subroutine 806 then passes to processing block 825. Processing block 825 initializes the dimension number for recall of the deviation of the first dimension of the next part. If the deviations for the last part number have been recalled then subroutine 806 calculates and prints a footer (processing block 839). This calculation could be the calculation of the number of parts in the range, the average deviation for each dimension of the set of parts, statistical functions on these deviations and other things. Subroutine 806 is then exited (end block 840).

FIG. 15 illustrates a section of the subroutine 806 which has been modified in accordance with an alternative embodiment of the present invention. In this alternative embodiment a print is made of only those dimensions of those parts which exceed the tolerances of the first range. The alternative routine illustrated in FIG. 15 is entered from processing block 825 of FIG. 14 which initializes the dimension number. In accordance with the prior embodiment of the subroutine 806 illustrated in FIG. 14, subroutine 806 next recalls the deviation corresponding to the specified part number and dimension number (processing block 826). Next subroutine 806 tests to determined whether or not the recalled deviation is within the first range (decision block 827). If the recalled deviation is outside this range then the number of defects is incremented (processing in block 829). Next subroutine 806 sets a printer flag true (processing block 841). This alternative embodiment of subroutine 806 next tests to determined whether or not the deviation is within the second range (decision block 830). As previously illustrated in FIG. 14, if this deviation is within the second range then the number of first defects is incremented (processing block 831). The program next sets emphasis for this deviation (processing block 842). In the event that the deviation is outside the second range then the number of second defects is incremented (processing block 833). Then a special emphasis is set (processing block 843).

Regardless of whether the second deviation lies within the first and second ranges subroutine 806 then tests to determine whether or not the last dimension number for this particular part has been reached (decision block 835). In the event that the last dimension number has not been reached then the dimension number is incremented (processing block 836) and control is returned to processing block 826 to recall the next deviation for that particular part number.

If the last dimension of a particular part number has been recalled then subroutine 806 tests to determine whether or not the print flag is true (decision block 844). In the event that the print flag is not true then control proceeds to decision block 837 to test to determine whether or not the deviations according to the last part number have been recalled. If the print flag is true then a print-out for that particular part number for those deviations which are outside either the first or the second range is made (processing block 845). Then the print flag is set false (processing block 846). Again control of the program is passed to decision block 837.

The alternative embodiment of the print report subroutine in FIG. 15 is advantageous because it enables immediate recognition of those dimensions which are outside of the first or second range. The alternative routine illustrated in FIG. 15 determines those particular part numbers which have deviations for any of their dimensions which are outside either the first or the second range. If this occurs then the particular dimensions are printed with emphasis, if the deviation is outside the first range but within the second range, and with special emphasis if the deviation is outside the second range. In the event that the particular part number has no dimensions which are outside the first range, then the printed report contains no data corresponding to this part number. It can easily be appreciated that such a defects only print-out is advantageous for immediately identifying the particular dimensions and the particular parts which are outside of the desired specifications.

FIG. 16 illustrates a flow chart of subroutine 807 for production of a graphic report, in accordance with the present invention. Subroutine 807 is begun by start block 850. Subroutine 807 first gets the desired ranges of part numbers to be displayed (processing block 851). This step is similar to the processing block 821 illustrated in FIG. 14. The subroutine 807 next inquires of the user the dimension number to be displayed in the graphic report (processing block 852). In accordance with the graphic report of the present invention, the deviations of a single dimension of a set of parts can be illustrated.

Subroutine 807 next recalls the specified deviations from the floppy disk 855 (processing block 853). This involves selecting the desired part numbers within the range specified by processing block 851 and recalling therefrom the deviations corresponding to the particularly specified dimension specified by processing block 852. This data is then processed in order to determine a deviation range factor for graphic display of this data (processing block 854). Similarly, a range factor is calculated for the number of parts within the range specified by the user (processing block 855).

The drawing of the graphic display occurs in three parts. Firstly, the header and scales are drawn (processing block 856). The header may include identification of the particular part and dimension and the scale may include an identification of the particular deviation range and part number on separate axes. Next the location of the tolerance dimensions is drawn (processing block 857). This permits the user upon inspection of the graphic display to immediately determine whether or not a particular dimension is within or outside the first and second ranges for that particular part. Lastly, the deviations are drawn (processing block 858. This process involves either a bar graph for each part or a point which is connected between adjacent parts via a line. This graphic display thus immediately shows the relationship for the dimensions to be set apart for the tolerances and to each other. Such things as a bias from the nominal value can be immediately identified using such a graphic display. Subroutine 807 is ended by an exit block 859.

I claim:

1. A gauging system for a manufactured part having a plurality of machined dimensions to be gauged, each machined dimension having a nominal value, said gauging system comprising:

at least one transducer probe having a movable measurement tip adapted to move in one dimension between a fully retracted position and a fully extended position, a biasing means to urge said measurement tip toward said fully extended position, said transducer probe generating an electrical distance signal dependent upon the position of said measurement tip, said measurement signal indicating zero distance when said measurement tip is extended a predetermined length; and a gauging fixture including
   a part receiving station for receiving an maintaining in a fixed location and orientation a manufactured part, and
   a plurality of zero-based measurement stations, each zero-based measurement station including a measurement block disposed in a predetermined location and orientation in relation to said fixed location and orientation of the manufactured part of the part receiving station, each zero-based measurement station having a transducer hole therethrough including means for positioning one of said at least one transducer probes in a predetermined location and orientation in relation to said fixed location and orientation of the manufactured part of the part receiving station, and predetermined location and orientation of said transducer probe such that said measurement tip contacts a corresponding machined dimension of the manufactured part when extended said predetermined length when said corresponding machined dimension of the manufactured part has a corresponding nominal value, whereby said electrical distance signal is zero if said corresponding machined dimension of the manufactured part has said nominal value.

2. The gauging system claimed in claim 1 wherein:
said gauging fixture further includes a part receiving plate having said part receiving station and said plurality of zero-based measurement stations disposed thereon; and
said part receiving station includes at least one part receiving post fixedly disposed on said part receiving plate for engaging the part and maintaining the part in said fixed location and orientation.

3. The gauging system claimed in claim 2, wherein:
said measurement block of each of said plurality of zero-based measurement stations is fixedly disposed upon said part receiving plate.

4. The gauging system claimed in claim 2, wherein:
each of said plurality of zero-based measurement stations includes an accurately machined location dowel having a fixed location in relation to said at least one part receiving post for specifying the location of said measurement block and an orientation dowel having a fixed location in relation to said location dowel for specifying the orientation of said measurement block; and
said measurement block is a removable member having an accurately machined location hole having a fixed location in relation to said predetermined location of said transducer hole adapted to receive said location dowel and an orientation hole having a fixed location in relation to said location hole adapted to receive said orientation dowel, whereby said measurement block is placed upon said location dowel and said orientation dowel for positioning said transducer probe at said predetermined location and orientation in relation to said fixed location and orientation of the manufactured part of said part receiving station.

5. A tool for use with a gauging fixture holding the machined dimensions of a part to be gauged in corresponding predetermined locations and orientations comprising:
a plurality of measurement blocks each having a transducer hole therethrough for receiving a generally cylindrical transducer probe, said transducer hole having a reference stop for positioning the transducer probe at a fixed insertion distance in said transducer hole; and
means for fixing each of said plurality of measurement blocks in a fixed location and orientation in relation to a corresponding machined dimension of a part to be gauged, whereby there is an identical fixed distance from said reference stop of each of said plurality of measurement blocks to the nominal value of the corresponding machined dimension.

6. The tool claimed in claim 5, wherein:
said means for fixing said measurement block includes at least one set of a first dowel and a second dowel having predetermined location and orientation relative to the machined dimension of the part to be gauged disposed on the gauging fixture and an accurately machined location hole having a fixed location in relation to said reference stop of said transducer hole adapted to receive a first dowel and an orientation hole having a fixed location in relation to said location hole adapted to receive a second dowel, whereby said measurement block is fixed at a fixed location and orientation by receiving said first dowel in said location hole and said second dowel in said orientation hole.

7. The tool claimed in claim 6, further comprising:
a holding means for retaining the transducer probe in a fixed position at said reference stop.

8. The gauging system claimed in claim 4, further comprising:
a calibration structure having a planar calibration face, an accurately machined location dowel having a fixed location relative to said calibration face and an orientation dowel having a fixed location relative to said location dowel, whereby said measurement block may be placed upon said location dowel and said orientation dowel thereby location said transducer probe in a predetermined location and orientation in relation to said calibration face with said measurement tip contacting said calibration face extended said predetermined length for permitting zero calibration of said electrical distance signal of said transducer probe.

* * * * *

UNITED STATES PATENT AND TRADEMARK OFFICE
CERTIFICATE OF CORRECTION

PATENT NO. : 4,831,741

DATED : May 23, 1989

INVENTOR(S) : Sogoian

It is certified that error appears in the above-identified patent and that said Letters Patent is hereby corrected as shown below: Title page:

In the abstract, line 3, "manufacturing" should be --manufactured--.

In the abstract, line 10, "manufacturing" should be --manufactured--.

Column 3, line 29, "part" should be --art--.

Column 6, line 50, "nn" should be --on--.

Column 8, line 66, "then-it" should be --then it--.

Column 9, line 1, "the lo first" should be --the first--.

Column 11, line 15, "858." should be --858).--.

Signed and Sealed this

Third Day of April, 1990

Attest:

HARRY F. MANBECK, JR.

Attesting Officer

Commissioner of Patents and Trademarks